United States Patent Office 3,707,561
Patented Dec. 26, 1972

---

3,707,561
POLYHALOGENATED AROMATIC AMINES
Lucien Sobel, Paris, Ludovic Parvi, Pont-de-Claix, and Arsene Isard, Grenoble, France, assignors to Ugine Kuhlmann, Paris, France
No Drawing. Filed Apr. 29, 1969, Ser. No. 820,310
Claims priority, application France, May 2, 1968, 150,251
Int. Cl. C07c 93/06
U.S. Cl. 260—570.7                                4 Claims

ABSTRACT OF THE DISCLOSURE

Polyhalogenated amines having the general formula:

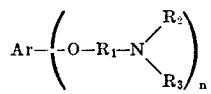

in which $n=1$ to 4, Ar is a polyhalogenated aromatic radical, $R_1$ is an aliphatic or cycloaliphatic radical and $R_2$ and $R_3$ are hydrogen or an aliphatic, cycloaliphatic or heterocyclic alkyl radical or together may form a cycle or heterocycle. The amines are prepared by reacting a polyhalogenated aromatic compound with either an alcoholate of an amino alcohol or with the amino alcohol in the presence of an alkaline agent. Flame retardant epoxy resins are prepared by reacting the amines with polyepoxides or by reacting the amines with epichlorhydrin and thereafter curing the so obtained epoxides by usual hardeners.

---

This invention relates to novel polyhalogenated aromatic amines, a method of preparing the novel amines, and fire retardant epoxy resins derived from the novel amines.

In the past attempts have been made to introduce halogens into epoxy resins in order to improve their flame resistance. For example, attempts have been made to use chlorinated or brominated derivatives of bis (hydroxyphenyl)-propane in the preparation of glycidic ethers. Also, halogenated compounds, such as chlorendic acid, have been used as hardeners and compounds such as pentachlorophenol and its glycidic ether have been introduced as reactive diluents in the preparation of epoxy resins for the same purpose. However, the products obtained do not give adequate self-extinguishing properties as measured by the A.S.T.M. D 635–56T test because the halogen content is too low.

Recently, proposals have been made to use hardeners with a polyamine base obtained by condensing strongly halogenated aromatic derivatives with polyamines. Even if products obtained in this manner provide effective resistance to flaming, they are unsatisfactory because they are strongly colored and the presence in the molecule of a nuclear NH group greatly reduces their resistance to aging.

Our invention overcomes these problems. The amines which are the subject of this invention enable the preparation of epoxy resins which have remarkable flame resistant properties. Bonding of the amino group with the polyhalogenated aromatic nucleus is assured by an ether oxide bridge.

Briefly stated, the polyhalogenated aromatic amines which comprise our invention have the following general formula:

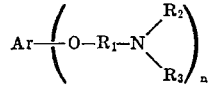

in which:

$n$ is equal to 1, 2, 3, or 4,
Ar represents a polyhalogenated aromatic radical,
$R_1$ represents an aliphatic or cycloaliphatic radical,
$R_2$ and $R_3$ each represent a hydrogen atom or an aliphatic, cycloaliphatic or heterocyclic alkyl radical or together may form a cycle or heterocycle.

Examples of suitable polyhalogenated aromatic radicals are polyhalophenyl (pentachlorophenyl), polyhalobiphenyl (octachlorobiphenyl), polyhaloterphenyl, polyhaloquaterphenyl, etc. The aliphatic or cycloaliphatic radicals represented by $R_1$ may have one or more functions or substituents such as amine, ether, halogen or an ethylenic double bond. However, we prefer a short chain alkyl radical. Similarly, the radicals represented by $R_2$ and $R_3$ may have one or more functions or substituents such as amine, ether, halogen or an ethylenic double bond. We prefer, however, that $R_2$ and $R_3$ be hydrogen or an alkyl radical.

The method of preparing the novel amines, which is a part of our invention, comprises reacting a polyhalogenated aromatic compound with either an alcoholate of an amino alcohol or with the amino alcohol itself in the presence of an alkaline agent. The reaction can be carried out either in the presence or the absence of one or more inert solvents. Generally, an almost stoichiometric amount of amino alcohol is used, although it would be possible, without disadvantage, to use a slightly different proportion. It is also preferable to introduce the alkaline agent in a stoichiometric amount or slightly higher.

Exemplary of amino alcohols that can be used are monoethanolamine, diethanolamine, triethanolamine, N-alkylethanolamines, and propanolamine. Among the polyhalogenated aromatic compounds which can be used are hexachlorobenzene, hexabromobenzene, hexafluorobenzene, trichlorotribromobenzene, polychlorobiphenyls, polychloroterphenyls, polychloroquaterphenyls, polybromobiphenyls, polybromoterphenyls, and polybromoquaterphenyls.

The process is notable for its selectivity although a concurrent reaction of substitution of halogen atoms by the amino group could be expected.

The epoxy resins which constitute a part of our invention can be prepared from the amines of our invention in two ways. Flame retardant epoxy resins can be prepared by direct reaction of an amine according to the invention with a polyepoxide. In this case, at least 2 of the $R_2$ or $R_3$ groups of the amine are hydrogen atoms. Suitable polyepoxides are polyglycidic ethers derived, for example, from bis (hydroxyphenyl)propane such as those commercialized by the Shell Company under the name of Epikotes or by the Ciba Company under the name of Araldites, cyclic epoxides such as epoxy-3-4-methyl-6-cyclohexane-carboxylate of epoxy-3-4-methyl-6-cyclohexyl-methyl and diepoxide of dicyclopentadiene.

Flame retardant epoxy resins of our invention can also be prepared by reaction of a common hardener with a polyepoxide of Type II

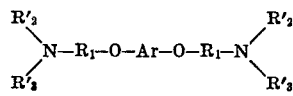

in which $R'_2$ and $R'_3$ are hydrogen atoms, aliphatic, cycloaliphatic, or heterocyclic radicals, but at least by molecule represent the glycidyl groups

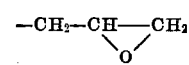

and Ar represents a polyhalogenated aromatic radical; or of Type III

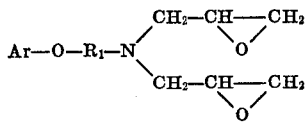

in which Ar represents a polyhalogenated aromatic radical. Suitable hardeners are anhydrides of di-carboxylic acids such as maleic anhydride or polyamines like dianiline methylene.

The following nonlimiting examples will illustrate the various aspects of the invention.

EXAMPLE I 499 g. of decachlorobiphenyl, 122 g. of monoethanolamine, 112 g. of flaked NaOH and 1200 cm.$^3$ of dioxane were introduced into a reactor provided with an agitation system, a reflux condenser, and heated by a thermostated bath. It was heated for 6 hours at the boiling point, and, after cooling, was filtered; then the filtrate was diluted with 250 cm.$^3$ of an aqueous solution of 10% NaCl and the excess of NaOH neutralized. As the result of the dilution, a paste was separated which was washed several times with water, and then dried in an oven at 50°.

The dry product contained 4.8% nitrogen and 51.1% chlorine. Theory for bis (amino-2-ethoxy)-octachlorobiphenyl: 51.9% chlorine, 5.1% nitrogen.

EXAMPLE II 58.6 g. of the product obtained in Example I, as well as 138.5 g. of epichlorohydrin were introduced into a reactor and heated at 110° C. to the point of dissolution. Then progressively in 20 minutes 31.2 g. of a 50% aqueous solution of NaOH were added and maintained at the boiling point until the end of the water distillation. The excess of epichlorohydrin was eliminated by evaporation under vacuum and the residue recovered by 200 cm.$^3$ of monochlorobenzene. By filtration the NaCl that was formed was separated and the filtrate was concentrated to obtain 85 g. of a yellow resin titrating 0.3 epoxy group and 40 g. of chlorine per 100 g.

At 80° C. 60 g. of this resin, 20 g. of Araldite 101 (polyepoxide commercialized by the Ciba Company) and 20 g. of maleic anhydride as a hardener were mixed, then the mixture was poured into a mold and heated at 150° C. for 15 minutes. Thus, a clear yellow, translucid, very hard and self-extinguishable (according to the A.S.T.M. D 635–56T test) plate was obtained.

EXAMPLE III 94.4 g. of decabromodiphenyl, 12.2 g. of monoethanolamine, 500 cm.$^3$ of dioxane and 11.2 g. of flaked NaOH were introduced into a reactor and heated for 5 hours at 100° under nitrogen. Proceeding as in Example I, a product was obtained that contained 68.6% of bromine and 2.97% of nitrogen. Theory for bis (amino-2-ethoxy)-octabromobiphenyl is 70.8% bromium, 3.1% nitrogen.

40 g. of this product were dissolved in 74 g. of epichlorohydrin and gradually 14.4 g. of a 50% aqueous solution of NaOH were added. Then, following the method of procedure of the above example, an epoxy resin was obtained that contained 0.18 epoxy group per 100 g. and 44% of bromine.

EXAMPLE IV 125 g. of decachlorobiphenyl, 44.5 g. of N,N-dimethylethanolamine, 28 g. of NaOH and 310 cm.$^3$ of dioxane were introduced into a reactor. They were heated at the boiling point for 3 hours and thirty minutes and the reactive mixture was treated under the conditions of Example I. A product was obtained that titrated 48.6% of chlorine and 4.1% of nitrogen.

We claim:
1. A polyhalogenated aromatic amine having the formula:

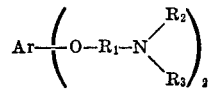

in which
Ar is a biphenyl fully halogenated
$R_1$ is a lower alkyl radical
$R_2$ and $R_3$ are selected from the group consisting of hydrogen and lower alkyl radicals.

2. Bis (amino-2-ethoxy) octachlorobiphenyl.
3. Bis (dimethyl amino-2-ethoxy) octachlorobiphenyl.
4. Bis (amino-2-ethoxy) octabromobiphenyl.

References Cited

UNITED STATES PATENTS

| | | | |
|---|---|---|---|
| 3,213,140 | 10/1965 | Mills | 260—570.7 |
| 3,308,158 | 3/1967 | Szobel et al. | 260—570.5 |
| 3,472,896 | 10/1969 | Seki et al. | 260—570.7 |
| 3,513,153 | 5/1970 | Horstmann et al. | 260—578 X |
| 3,542,874 | 11/1970 | Keizer | 260—570.7 |
| 2,952,678 | 9/1960 | Lane | 260—570.7 X |

FOREIGN PATENTS

| | | | |
|---|---|---|---|
| 1,020,031 | 11/1957 | Germany | 260—570.7 |

ROBERT V. HINES, Primary Examiner

U.S. Cl. X.R.
260—2 EP, 47 EP

UNITED STATES PATENT OFFICE
CERTIFICATE OF CORRECTION

Patent No. 3,707,561      Dated December 26, 1972

Inventor(s) Lucien Sobel, Ludovic Parvi and Arsene Isard

It is certified that error appears in the above-identified patent and that said Letters Patent are hereby corrected as shown below:

Column 2 Line 67 --but at least-- should read --but two at least--.

Signed and sealed this 29th day of May 1973.

(SEAL)
Attest:

EDWARD M. FLETCHER, JR.        ROBERT GOTTSCHALK
Attesting Officer        Commissioner of Patents